United States Patent Office 3,393,854
Patented July 23, 1968

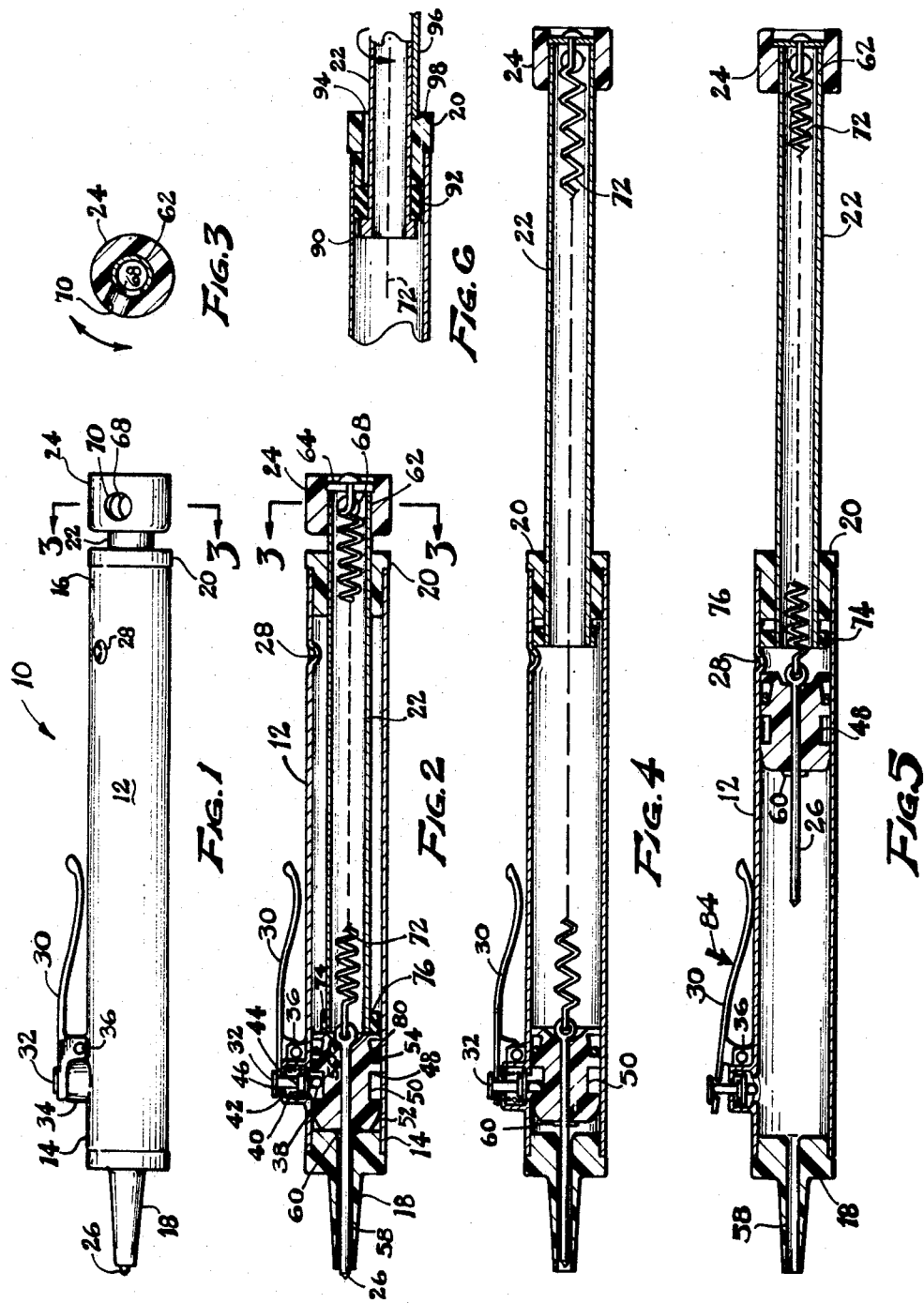

3,393,854
MINIATURE SOLDER REMOVER APPARATUS
William S. Fortune, 14250 Dearborn St.,
Panorama City, Calif. 91402
Filed Aug. 4, 1966, Ser. No. 570,302
6 Claims. (Cl. 228—20)

This invention relates generally to electrical and electronic equipment manufacture, repair, and rebuilding, and more particularly to the removal of molten solder from electrical wiring connections. The present invention relates to and constitutes improvements relating to the invention shown and discussed in U.S. Patents Nos. 3,114,026 and 3,263,889.

Although the present invention finds particularly useful application in the field of soldering and desoldering and rewiring elements or components by technicians or engineers in an electronic research laboratory or at a hobbyist's workbench; and although in the cause of brevity and clarity, most of the following discussion of examples of the invention are directed theretoward, it is expressly to be understood that the advantages of the invention are equally well manifest in other fields where a molten substance is to be removed from a particular region.

As is well known to persons skilled in the electric arts, it is often desired to desolder an electrical connection; and the removal of the molten solder from the connection, without dropping or spattering molten solder onto other portions of the equipment, is highly advantageous. Blowing the molten metal away is therefore not an acceptable practice; and the high surface tension associated with the solder precludes or causes to be impractical the removal of the solder by means other than vacuum devices. The problem is typically aggravated by the requirement that the solder be removed, in its molten state, before a mechanical connection, such as a wrapped wire lead, under the solder may be taken apart.

Certain aspects of the problem have been successfully solved by the development in recent years of solder removing tools, examples of which are described in the above specified patents. The apparatus disclosed in the earlier of said patents includes a small hand-held thin-walled cylinder which houses a spring-loaded vacuum producing piston. The piston is connected to an axial shaft which passes through a bushing assembly at the top end of the cylinder and is terminated by a knob. The bushing end of the cylinder also includes a trigger means which cooperates with the shaft in a manner to hold the piston, against spring force, near the opposite end of the cylinder until the trigger is depressed. This opposite end of the cylinder is substantially closed by a tip member having a solder removing hollow tube extending therethrough, and which, in operation, is placed near the molten solder to be removed. When the trigger is depressed, the piston is forced by the spring quickly to the upper end of the cylinder and the resulting vacuum draws the molten solder into the cylinder through the hollow tube of the tip member. For a subsequent vacuum stroke the piston is again forced to the tip end by hand force applied to the knob, and held there until the trigger mechanism is actuated. As indicated, these devices have advanced the state of the art and have in large measure solved certain portions of the problems outlined; however they suffer some disadvantages, for some applications, due to the flyback action of the piston-shaft-knob assembly during the vacuum stroke. The shaft which connects the spring-loaded piston to the cocking knob must be heavy and strong enough to cock the loading spring and the knob must be large enough and soft enough for convenient repeated cocking by the operator. These factors cause the piston-shaft-knob assembly to have considerable mass compared to the lightweight cylinder housing. Accordingly, when the trigger is depressed and the piston assembly flies back, the outer housing suffers a recoil action causing a deflection of the tip from the location of the molten solder. Another disadvantage of the flyback associated with the knob and shaft is that typically the operator places his head near the tool during the vacuum stroke and his eye may be damaged if struck by the cocking knob. Many of these disadvantages have been eliminated by devices constructed in accordance with the teachings of the latter of the referenced patent; however, the resulting devices are typically somewhat more complex and costly.

Accordingly, it is an object of the present invention to provide novel vacuum desoldering apparatus which is not subject to these and other disadvantages or limitations of the prior art.

It is another object to provide such apparatus which is compact and miniature and of the character to be readily on hand to the user at all times by virtue of its being adapted for shirt or vest pocket carrying and storage.

It is another object to provide such apparatus which has no exposed flyback portion.

It is another object to provide such apparatus which has very low inertia associated with the flyback portion thereof causing a negligible deflection of the tool during the vacuum stroke.

It is another object to provide such apparatus which is simple and inexpensive in the construction and maintenance and which is rugged, dependable, and has a long life without degraded performance.

It is another object to provide such apparatus which provides, as a result of its vacuum stroke, a relatively large volume of air flow in an impulse surge thereby flash cooling any remaining solder to render it into a weak crystalline form to minimize its bonding strength.

Briefly, these and other objects are achieved in accordance with the structural features of one example of the present invention which includes a pen-sized, thin-walled tubular body. A hollow tip member is snugly disposed in one end and a cocking shaft bushing is secured in the other. A piston member is slidingly disposed between the two and is fastened to one end of a tension spring while the other end is fastened to the opposite end of a hollow cocking shaft which is disposed slidingly through the bushing fitting at the end of the tubular body. The spring thus urges the cocking shaft and the piston axially toward each other.

The length of the cocking shaft is of the same order as that of the tubular body so that when the cocking shaft is depressed into the tubular body through the bushing end and toward the tip end, the piston member is engaged and pushed toward the tip end by the forward end of the cocking shaft. Once thusly displaced, the piston is locked at the tip end by a trigger mechanism which is actuable externally of the tubular body at the tip end. In this example, the actuator handle of the trigger mechanism is also a shirt pocket clip member. In this disposition, the spring is entirely within the hollow cocking shaft.

The inner or forward end of the cocking shaft is fitted with a cam element which, when the shaft is pulled fully outwardly or rearwardly, is locked in that position by a cam engaging element carried by the bushing end of the tubular body. The tension spring is thereby stretched to approximately twice its normal length, and with the cocking shaft locked rearwardly and the piston member locked forwardly, the desoldering tool is cocked for use. The tip member may then be placed near the molten solder and the trigger mechanism tripped to unlock the piston member to permit it to fly rearwardly toward the bushing end of the tubular body. The air pressure on the back side of the piston element is released by flow through the hollow cocking shaft; and this flow may be controlled by adjustment of a simple relief valve on the handle end of the cocking shaft for purposes of shaping the vacuum impulse as seen by the tip end of the tool.

Once the vacuum stroke has been completed, the cocking shaft may be rotated to unlock the cam thereon from the cam engaging element to permit the forward of inward travel of the cocking shaft until the piston element pushed thereby is again engaged and locked by the trigger mechanism. The cocking plunger shaft may then again be pulled rearwardly until the spring is stretched and the cam locking is again achieved to cock the tool for a second vacuum stroke.

It is particularly to be noted that the only significant motion of apparatus during the vacuum stroke is that of the piston member which may be of lightweight plastic, and the forward portion of the tension spring which also may have a low mass constructin.

Further details of these and other novel features and their principles of operation as well as additional objects and advantages of the invention wil become apparent and be best understood from a consideration of the following description taken in connection with the accompanying drawing which is presented by way of illustrative example only and in which:

FIGURE 1 is a side elevational view of a desoldering tool constructed in accordance with the principles of the present invention;

FIGURE 2 is a longitudinal sectional view of the structure of FIGURE 1;

FIGURE 3 is a cross-sectional view of a portion of the structure of FIGURES 1 and 2 taken along the reference lines 3—3 thereof;

FIGURES 4 and 5 are sectional views like that of FIGURE 2 showing the apparatus in different stages of operation; and FIGURE 6 is a sectional view of an alternative example of the invention.

With specific reference now to the figures in detail, it is stressed that the particulars shown are by way of example and for purposes of illustrative discussion only and are presented in the cause of providing what is believed to be the most useful and readily understood description of the principles and structural concepts of the invention. In this regard no attempt is made to show structural details of the apparatus in more detail than is necessary for a fundamental understanding of the invention. The description taken with the drawing will make it apparent to those skilled in the manufacturing and electrical arts how the several forms of the invention may be embodied in practice. Specifically, the detailed showing is not to be taken as a limitation upon the scope of the invention which is defined by the appended claims forming, along with the drawing, a part of this specification.

In FIGURE 1 the example of the desoldering tool 10 illustrated includes a pen-shaped thin-walled tubular body 12 having a forward tip end 14 and a rearward bushing end 16. A hollow tip member 18 is shown fitted within the tip end 14 and a cocking shaft bushing fitting 20 is shown disposed at the opposite, bushing end 16 of the tubular body member 12. A cocking shaft 22 is disposed axially slidably protruding through the bushing fitting 20 and includes a rotatable valve knob member 24 affixed to the extreme end thereof. The solder removing tip member 18 is axially bored and a tip cleaning extension 26 may be seen protruding therethrough.

Carried on the tubular body member 12 is a cam engaging detent 28 and a pocket clip trigger actuating member 30. The trigger proper is indicated, at 32, as extending radially outwardly through a trigger housing portion 34. A pivot mounting 36 secures, in this example, the trigger actuating member 30 to the tubular body member 12.

Referring to FIGURE 2 the elements and components of the structure of FIGURE 1 are shown in section and in internal detail. In this regard the thin-wall nature of the tubular body member 12 and the cam retaining detent 28 as well as, in this example, the press-on fittings 20, 18 are emphasized. It may be noted that the tip end fitting 18 is readily removable from its engagement with the tip end 14 of the tubular body 12, as for purposes of replacement or for cleaning and oiling of the interior portions of the tubular body member 12. The trigger member 32 is seen to extend radially inwardly of the wall of the tubular body member 12; and its tip end 38 is retained therewithin by virtue of a trigger compression spring 40 which is retained compressively between the roof portion 42 of the housing 34 and a retainer flange 44 secured to a midportion of the body of the trigger member 32. By this means when the pocket clip trigger actuating member 30 is depressed radially inwardly causing rotation thereof about the pivot 36, the cap end 46 of the trigger member is engaged thereby, and the tip end 38 of the trigger member is lifted radially clear of the inner surface of the cylindrical wall of the tubular member 12.

A piston member 48 is disposed axially slidably within the tubular body member 12 and includes an annular trigger engaging channel 50, a trigger tip raising nose portion 52 and a conically bottomed, piston ring retaining channel 54. A tip cleaning extension rod 26 passes axially through the piston member 48 which, in this example, forms at its rear end contiguous to the rear or inner end of the piston member 50 a tension spring end retaining eyelet 56 and its forward end protrudes as shown through the axial bore 58 of the hollow tip member 18 when the piston member 48 is disposed fully forwardly within the tubular body member 12. The piston member 48 may be secured to the cleaning rod 26 by a grippping retainer nut 60.

The hollow cocking shaft 22 is seen to have a length which is of the same order as that of the hollow tubular body 12 whereby it extends for the full length thereof from the rear of the piston member 50 through the bushing member 20 to form a rearwardly extending external portion 62. A spring end retaining cap member 64 may be affixed as shown to the terminal portion of the extension 62. The rotatable valve knob member 24 may also be secured in part to the extension 62 by means of the retaining cap member 64. A relief port 68 is provided through the hollow wall portion of the extension 62 which may be placed in adjustable degrees of register with a similar port 70 formed through the wall thickness of the rotatable valve knob member 24.

A tension spring 72 retained at its ends as implied above urges at all times the extension 62 toward the rear surface of the piston member 50. It should be noted that the length relationship of the cocking shaft 22, the knob member 24, the tubular body member 12, the piston member 50, and the portions of the tip member 18 which are disposed with the tip end 14 of the hollow tubular body member 12 as well as the axial location of the trigger member 32 are such that when the cocking shaft 22 is depressed into the tubular body member 12 in a pushing engagement with the rear surface of the piston member 50, the tip member 18 may be at least partially ejected to aid in the cleaning or replacement thereof.

A cam member 74 is disposed on the forward terminal portion of the cocking shaft 22 and includes a raised portion 76 which may be engaged by the cam engaging detent 28 to hold the cocking shaft in an extreme rearward disposition upon pulling it rearwardly by the knob member 24 and rotating it so that the cam raised portion 76 is retained behind the detent 28.

An O-ring type piston ring 80 is shown disposed within the retaining channel 54 and is provided with an axial freedom of motion. In this regard it may be seen that when the piston ring is displaced axially forwardly in the conical bottom retaining channel 54, it is urged radially outwardly to form a tighter seal between the piston member 50 and the inner walls of the tubular body member 12. Conversely when the piston ring is displaced relatively rearwardly in the channel 54, it is radially substantially removed from engagement with the inner wall of the body member 12. Thusly when the piston member is moving rearwardly to provide the vacuum stroke, the seal between piston ring and tubular body member is substantially complete while its motion in the opposite, cocking, direction is relatively free and not particularly airtight. It may also be noted that the fitting between the trigger member 32 and its housing 34 and the opening through the wall of the tubular body member 12 for the tip end 38 of the trigger member is relatively snug whereby the trigger mechanism constitutes a negligible air leak through the wall of the body member.

In operation the desoldering tool 10 is cocked by depressing the cocking shaft 22 forwardly all the way into the tubular body member 12 thusly pushing the piston member 48 forwardly and raising the tip end 38 of the trigger member 32 by its engagement with the rounded or tapered nose portion 52. The piston member 48 is then restrained against axial motion, particularly rearwardly by engagement of the tip end 38 of the trigger member of the forward annular wall of the retaining channel 50. The cocking shaft 22 may then be pulled rearwardly past the cam engaging detent 28 whereby, upon proper rotation of the cocking shaft 22, the raised cam portion 76 is retained against forward motion by its engagement with the detent 28.

When the desoldering tool 10 is thusly fully cocked, the tension spring 72 is stretched to its full design extension and the nozzle portion of the tip member 18 may be placed near the molten solder to be removed. This fully cocked condition of the tool is illustrated in FIGURE 4.

Before the trigger actuating member 30 is depressed to lift the trigger member 32 radially outwardly from its engagement with the retaining channel 50, the rotatable valve knob member 24, see FIGURE 3, may be rotated so that its opening 70 is in a desirable relief valve opennig relationship with the port 68 in the wall of the cocking shaft end portion 62.

With reference to FIGURE 5 the trigger actuating member 30 may be depressed as indicated by the force arrow 84 causing a rotation of the actuator member about the pivot mounting 36 causing in turn a lifting of the trigger member out of engagement with the piston member 48 thereby permitting it to fly rearwardly to its disposition as shown in FIGURE 5, the speed of the rearward travel being controllable within limits by the adjustment of the rotatable valve knob member 24 with respect to the rear extension 62 of the cocking shaft 22.

It may thus be noted that the vacuum stroke may be repeated by rotating the raised portion 76 of the cam 74 away from its engagement with the cam engaging depression 28 and pushing the piston member 48 forwardly toward the tip end 18 by inserting substantially the full length of the cocking shaft 22 into the body of the tubular member 12 through the bushing member 20. It may also be noted that the cleaning rod extension 26 automatically cleans the bore 58 of the forward tip member 18 during the cocking process.

Referring to FIGURE 6 an arrangement of the invention alternative in certain respects to that of the previous figures is shown. The forward, tip end of the cocking shaft 22 is terminated by a retaining collar 90 in back of which is disposed a soft rubber, in this example, sealing ring member 92 which axially fills the gap between the collar 90 and the forward face of the bushing fitting 20. The sealing member 92 seals any annular play between the cocking shaft 22 and the bore of the fitting 20 and, in addition seals the end of a keywawy channel 94 formed therealong as shown. The channel 94 is dimensioned to receive slidingly an elongated raised key portion 96 formed along the length of the cocking shaft 22. Elsewhere, angularly, about the rear face of the bore, a detent 98 may be formed to receive the forward end of the key portion 96 when it has been, in the cocking step, drawn rearwardly through the bushing fitting and rotated to the position of the detent 98. It may, accordingly, be seen that keyway channel 94, the key portion 96, and the rear face of the fitting 20 fulfill the cocking functions described above in connection with the earlier figures.

There have thus been disclosed and described a number of the structural aspects of a particular example of a vest pocket-sized desoldering implement which achieves the objects and exhibits the advantages set forth hereinabove:

What is claimed is:

1. Desoldering tool comprising:
   tubular body member having a forward tip end and a rear bushing end
   tip end fitting carried removably by said forward tip end and having an axially disposed solder removing duct bore formed therethrough,
   cocking shaft bushing means disposed concentrically with and carried by said rear bushing end,
   piston means disposed axially slidably within said tubular body member between said tip end fitting and said bushing means,
   hollow cocking shaft means having a length of the order of that of said tubular body member and having a rear outer end and a forward inner end and being disposed axially slidably through said bushing means,
   cocking shaft retaining means carried by and disposed contiguously to said bushing end of said tubular body member for holding said cocking shaft in an axially rearward disposition,
   tension spring means having one end affixed to the rear of piston means and one end affixed to said rear end of said cocking shaft means and being disposed axially freely within, in part, said hollow cocking shaft means and, in remainder part, said tubular body member in a manner to urge said piston means of said cocking shaft axially toward each other, said piston means being pushable forwardly toward the tip end when said cocking shaft is moved forwardly in contact with the said rear surface thereof, and trigger means carried by said tubular body member and disposed contiguously to said tip end thereof for engaging and retaining said piston means forwardly against the tension forces of said spring means, said trigger means being actuable externally of said tubular body member for selectively releasing said piston member when a vacuum stroke is desired.

2. The invention according to claim 1 in which said cocking shaft is rotatable about the axis of said tubular body member and which further includes a cam element, carried by the forward end of said cocking shaft, of the character selectively to engage said cocking shaft retaining means depending upon the angular disposition of said rotatable cocking shaft.

3. The invention according to claim 1 which further includes adjustable relief valve means carried at said rear end of said hollow cocking shaft.

4. The invention according to claim 1 in which said trigger means comprises radially inwarwdly biased trigger element and a pocket clip actuator member pivotally mounted on said tubular body member in radial outwardly liftable engagement with said trigger element.

5. The invention according to claim 1 which further includes a tip cleaning rod extension member carried by said piston member and extending axially forwardly thereof through said solder removing duct bore of said tip end fitting.

6. The invention according to claim 1 in which the axial disposition of said trigger means and the length relationships of said hollow tubular member, said cocking shaft, said piston member, and said tip end fitting are such that excess forward displacement of said cocking shaft beyond that required for cocking engagement between said piston member and said trigger means is permitted and such excess displacement causes tip end fitting removal engagement between said tip end fitting and said piston member.

References Cited
UNITED STATES PATENTS 3,114,026  12/1963  Fortune _____ 228—20
3,263,889   9/1966  Fortune _____ 228—20

RICHARD H. EANES, JR., *Primary Examiner.*